March 2, 1954
C. PAVIA
2,671,098
APPARATUS AND METHOD FOR RENDERING FAT
Filed Oct. 14, 1949
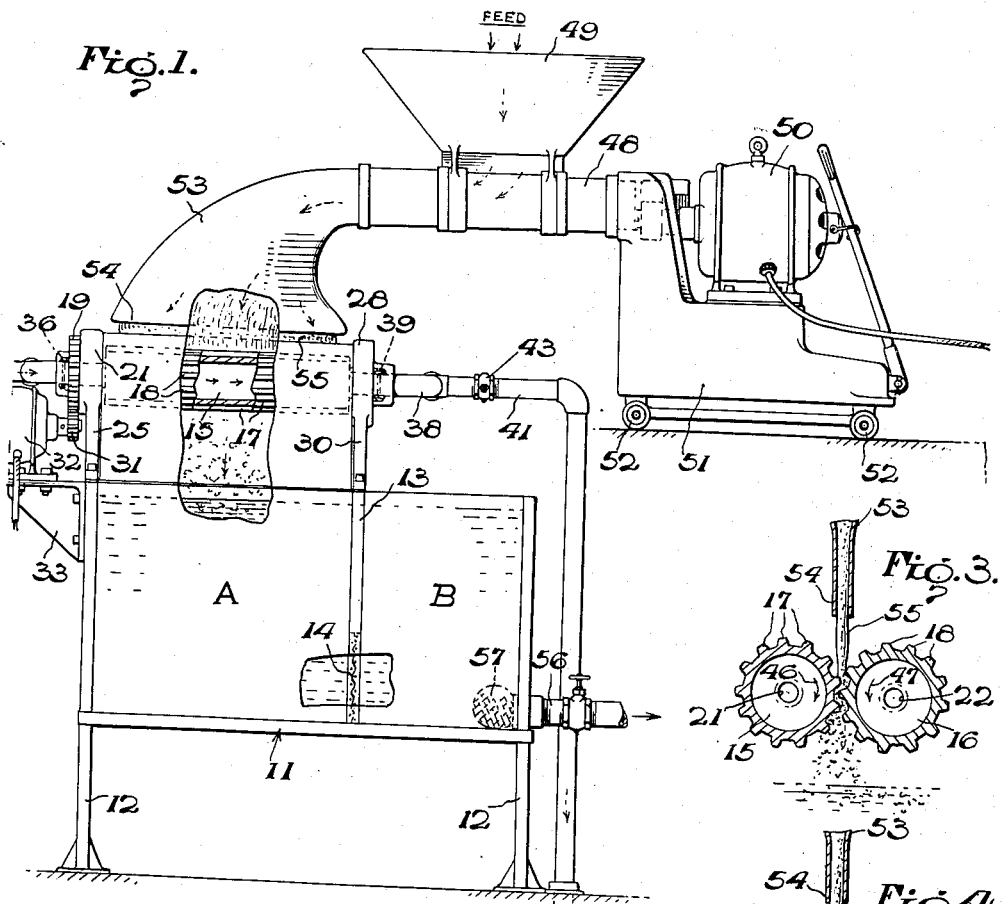
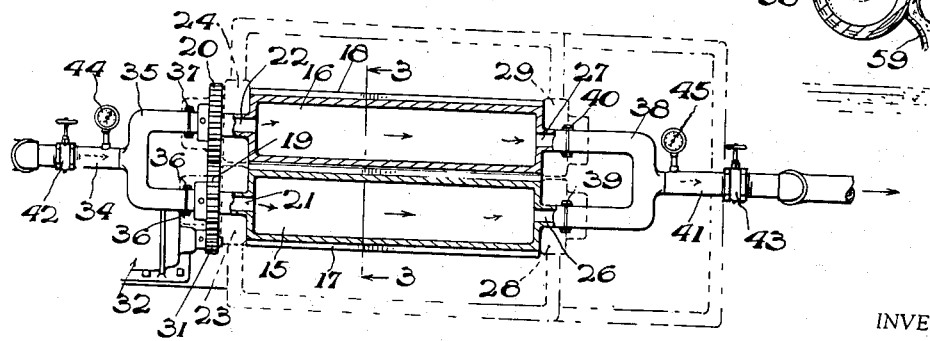
INVENTOR
Charles Pavia.
BY Albert J. Kramer
ATTORNEY Patented Mar. 2, 1954

2,671,098

UNITED STATES PATENT OFFICE 2,671,098

APPARATUS AND METHOD FOR RENDERING FAT

Charles Pavia, New Market, Va., assignor to Pavia Process, Inc., Washington, D. C., a corporation of Delaware Application October 14, 1949, Serial No. 121,425

4 Claims. (Cl. 260—412.6)

This invention relates to rendering and is more particularly concerned with methods and equipment for rendering fat.

One of the objects of this invention is the provision of a method for continuously rendering fats, as distinguished from batch operations heretofore employed, and means for carrying out the method.

Another object of the invention is the provision of means for continuously rendering fats in which the fat is heated for only a brief period of time thereby reducing to a minimum chemical breakdown of the fat and of the fat tissues.

A further object of the invention is the provision of such means which is positive in its action and which can be controlled to provide optimum conditions for different types of fat, such as hog (leaf, back, etc.), beef, mutton, fowl, and others.

Still another object of the invention is the provision of such means which can be used for rendering both edible and non-edible fats.

A still further object of the invention is the provision of such means which occupies only a small space, is inexpensive to operate from the point of view of labor, heat requirements, overhead and general repairs and maintenance.

Other objects and advantages of the invention will be apparent from the following description considered together with the accompanying drawing illustrating an embodiment of the invention.

In the drawing:

Fig. 1 is a side elevational view, partly broken away, of the embodiment.

Fig. 2 is a section along the line 2—2 of Fig. 1.

Fig. 3 is a section along the line 3—3 of Fig. 2.

Fig. 4 is a section similar to that of Fig. 3, showing a modified form of the embodiment.

Referring with more particularity to the drawing in which like numerals designate like parts, the embodiment illustrated comprises a tank or other suitable receptacle 11, supported on legs 12. The inside of the tank or receptacle is divided into two compartments A and B by means of a partition 13 extending from the top of the tank to the bottom thereof. The lower part of the partition is foraminous which may consist of perforations or holes through the partition or, as illustrated, by the use of a screen 14 forming the lower portion of the partition.

Above the compartment A, there is mounted a pair of horizontal cylinders or rollers 15 and 16. Said rollers are positioned adjacent each other with a space between them directly over the compartment A. Around the periphery of said rollers 15 and 16, projections, such as the spaced teeth 17 and 18, respectively, are disposed. The spaces between the projections are wider than the teeth themselves so that the projections of one roller can be maintained in spaced interlocked relation relative to the projections of the other roller while they are rotating. This may be accomplished by meshed gears 19 and 20 secured to the hollow shafts 21 and 22, respectively, secured to and projecting from one end of the said rollers, said shafts being journaled in bearings 23 and 24 on stanchions 25 at the top of the tank 11.

Similar hollow shafts 26 and 27 project from the other ends of said rollers and are journaled in bearings 28 and 29 on stanchions 30 at the top of said tank.

The rollers 15 and 16 are driven by a pinion 31 meshed with one of the gears 19 and 20, say gear 19, and are connected to a source of power, such as the variable speed electric motor 32 supported on a bracket 33 on the outside of the tank.

The hollow shafts 21 and 22 on one end of the rollers are connected to a pipe 34 leading from a source of steam under pressure (not shown) through an inlet manifold 35. The outlets of the manifold are connected to the outer ends of the shafts 21 and 22 by means of fluid seals 36 and 37 of any suitable type.

A similar outlet manifold 38 is connected to the outer ends of the hollow shafts 26 and 27 by means of fluid seals 39 and 40 and to an outlet pipe 41. The pipes 34 and 41 are each provided with a valve 42 and 43, respectively, to control the flow and pressure of steam through the rollers. Suitable steam gauges 44 and 45 are also tapped into said pipes.

By these means, the rollers may be driven at any speed desired in the direction of the arrows 46 and 47 and their projections are maintained in constant interlocked relation with each other while steam is constantly supplied to them to keep them at any desired temperature. Accordingly, the amount of heat delivered to fat passing through said rollers may be varied either by changing the speed of the rollers or the pressure of the steam therein, or by both.

In operation, it is preferred that the fat to be rendered be in a comminuted form and that the particles be of a size sufficiently small to permit them to pass between the rollers. For this purpose, a comminuting device, such as a power grinder 48, may be used. The said grinder is provided with the usual feed hopper 49 and may be driven by any suitable source of power, such as the electric motor 50. It is preferably mounted on a carriage 51 supported on wheels or rollers 52 to permit it to be moved from one rendering unit to another. In practice, the grinder would be supported at a higher elevation in the rendering plant than the tank 11, as illustrated, to permit its outlet to be directly over the rollers 15 and 16. The outlet piece or nozzle 53 of the grinder has its outer end bent downwardly at right angles to the axis of the grinder and flattened on both sides to provide a narrow flat opening 54 directly over the space between the rollers 15 and 16 and generally coextensive therewith. By this arrangement the outlet piece acts to spread the fat coming from the grinder into a relatively thin sheet 55 before it passes through the rollers, thereby increasing the efficiency of the rendering operation.

The material to be rendered is fed into the hopper 49, is ground by the grinder and delivered in a sheet to the rollers 15 and 16. The rollers are maintained hot by the passage of steam under pressure therethrough. As the comminuted fat strikes the hot rollers, the cells which normally contain the fat are broken open, thereby releasing the fat in liquid form. The cellular matter and the liquid fat fall into the tank in compartment A and are commingled. If desired, an agitator or other mixing device (not shown) may be employed in the compartment to effect a positive mingling of the fat with the cellular matter. If the procedure is carried out in such a manner that the cellular matter is not substantially carbonized or disintegrated by the heat, then the cellular matter will float on the fat in compartment A, while the fat at the bottom of the compartment will pass through the foraminous portion 14 at the lower end of the partition and hence into the compartment B. Also the chemically undamaged cellular matter will absorb any water in the system, if the comminution has been made fine enough. Accordingly, it is unnecessary for the rendered fat to settle, as in ordinary rendering methods when cracklings are made, as the fat in compartment B may be drained promptly and continuously through a valved outlet pipe 56. Comminuting the fat to a size in the range of ½ to 1/32 of an inch is generally satisfactory for obtaining these results, although better results are obtained if the particle size is substantially ¼ of an inch or less, the preferred range for practical purposes being ⅛ to 1/42 of an inch. Comminution to this extent exposes a greater number of fat cells to the direct action of the heat from the rollers and also increases the water absorption capacity of the cellular matter.

Better results are also obtained if the comminuted fat before being rendered is in a frozen or near frozen condition, because the heat shock causes the cells in this condition to crack open more readily.

For practical purposes the temperature of the rollers should be at about 310° to 340° F. For most fats, a temperature in the range of about 315° to 325° F. is preferred.

In using the apparatus, it is advantageous to maintain the liquid level in the tank sufficiently high to keep the floating cellular matter above the foraminous section 14. This prevents the screen from becoming unduly clogged and effective for holding back incipient particles which may find their way to the bottom of the tank. However, instead of utilizing two compartments A and B, it is possible to use only one compartment with a screen guard 57 about the inner end of the outlet pipe 56. The screen guard may, however, also be used with the double compartments to effect an extra screening operation.

The modification illustrated in Fig. 4 comprises substituting a single smooth hollow roller 58 for the two rollers 15 and 16. The outlet of the grinder is positioned, as shown, above the roller. Fat striking the roller absorbs heat therefrom as it is carried around it in the direction of its rotation, the time of contact therewith being controlled by the speed of rotation of the roller. A doctor blade 59 may be used to guide the material off the roller at the desired point.

Having thus described this invention, what is claimed is:

1. In an apparatus for rendering fats from fatty tissues, the combination comprising a receptacle for receiving rendered fat, a pair of parallel spaced rollers above said receptacle, means for rotating said rollers, means for heating said rollers to a temperature sufficient to render the fats, a grinder having a hopper and a discharge opening above said rollers, and a nozzle having one end thereof connected to said discharge opening, the other end of said nozzle facing downwardly over the spaces between said rollers and being in the form of a long narrow slot.

2. An apparatus for rendering fat from fatty tissue comprising a grinder for grinding the tissue, said grinder having a discharge opening, a nozzle having one end connected to said opening, the other end of the nozzle being in the form of a long, narrow slot to extrude the ground fatty tissue material in a continuous thin sheet, a heat exchanger between the nozzle and the receptacle for heating the sheet of fatty tissue material to rendering temperatures as it passes into the receptacle, and means for continuously heating said heat exchanger to rendering temperatures.

3. A method of rendering fat from fatty tissues comprising comminuting the fatty tissues, extruding the comminuted tissues in the form of a sheet, passing the sheet of fatty tissue continuously between heat exchange surfaces and heating the fatty tissues to rendering temperatures, collecting the cellular tissue and liquid fat rendered from the fatty tissue, and separating the fat from the cellular tissue.

4. A method as defined by claim 3 in which the fatty tissues are heated to a temperature of 310° to 340° F.

CHARLES PAVIA.

References Cited in the file of this patent

UNITED STATES PATENTS

| Number | Name | Date |
|---|---|---|
| Re. 9,254 | Andrew | June 15, 1880 |
| 37,482 | Amelung | Jan. 27, 1863 |
| 732,151 | Allbright | June 30, 1903 |
| 1,317,675 | Allbright | Oct. 7, 1919 |
| 1,567,408 | Axelsen | Dec. 29, 1925 |
| 1,930,091 | Halvorson et al. | Oct. 10, 1933 |
| 2,035,090 | Molin | Mar. 24, 1936 |
| 2,386,775 | Balzarini | Oct. 16, 1945 |
| 2,397,446 | Tansley | Mar. 26, 1946 |
| 2,467,529 | Hormel | Apr. 19, 1949 |
| 2,516,071 | Pavia | July 18, 1950 |
| 2,545,451 | Elsaesser | Mar. 20, 1951 |